United States Patent [19]
Fletcher et al.

[11] 3,790,037
[45] Feb. 5, 1974

[54] METERING GUN FOR DISPENSING PRECISELY MEASURED CHARGES OF FLUID

[76] Inventors: James C. Fletcher, Administrator of the National Aeronautics and Space Adiministration with respect to an invention of; Thomas A. Cook, 13681 Onkay Circle, Santa Ana, 92705; Hans Scheibe, 13742 Claremont St., Westminister, both of Calif. 92683

[22] Filed: June 28, 1972

[21] Appl. No.: 266,925

[52] U.S. Cl. .............................. 222/324, 222/444
[51] Int. Cl. .............................................. G01f 11/02
[58] Field of Search ....... 222/36, 38, 324, 388, 440, 222/444, 453; 137/625.69; 251/250

[56] References Cited
UNITED STATES PATENTS

| | | | |
|---|---|---|---|
| 2,737,022 | 3/1956 | Collins | 222/444 |
| 411,375 | 9/1889 | Cooke | 222/440 X |
| 1,395,469 | 11/1921 | Benbow | 137/625.69 |
| 2,995,337 | 8/1961 | Tanner | 251/250 |
| 1,913,062 | 6/1933 | Wheeler | 222/38 X |

*Primary Examiner*—Robert B. Reeves
*Assistant Examiner*—Thomas E. Kocovsky
*Attorney, Agent, or Firm*—L. D. Wofford, Jr. et al.

[57] ABSTRACT

A cyclically operable fluid dispenser particularly suited for use in dispensing precisely measured charges of potable water aboard spacecraft. The dispenser is characterized by a sealed housing adapted to be held within a crewman's palm and coupled with a pressurized source of potable water, a dispensing jet projected from the housing and configured to be received within a crewman's lips, an expansible measuring chamber for measuring charges of drinking water received from the source, and a dispenser actuator including a lever extended from the housing to be digitated for initiating operational cycles, whereby precisely measured charges of potable water selectively are delivered for drinking purposes in a weightless environment.

4 Claims, 8 Drawing Figures

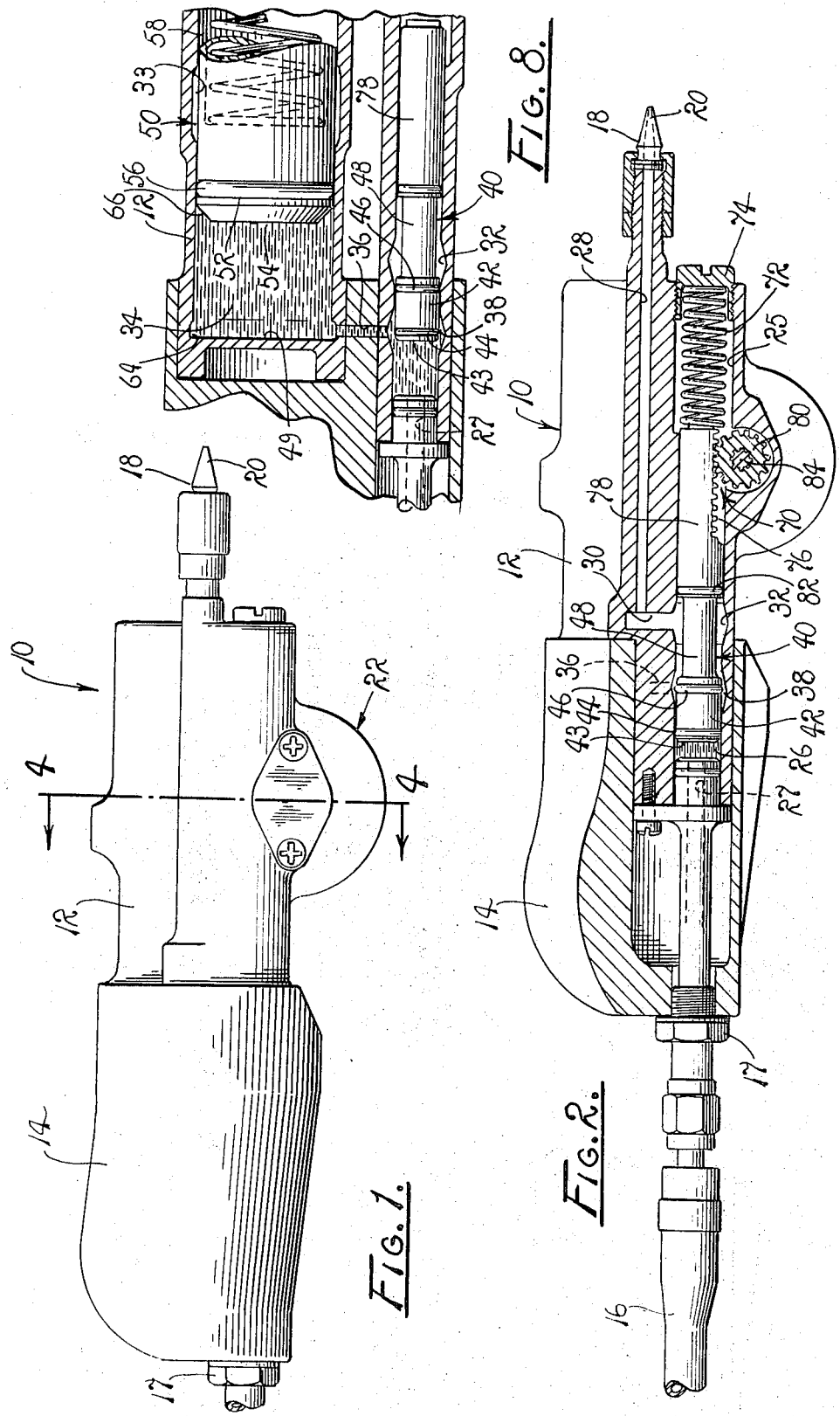

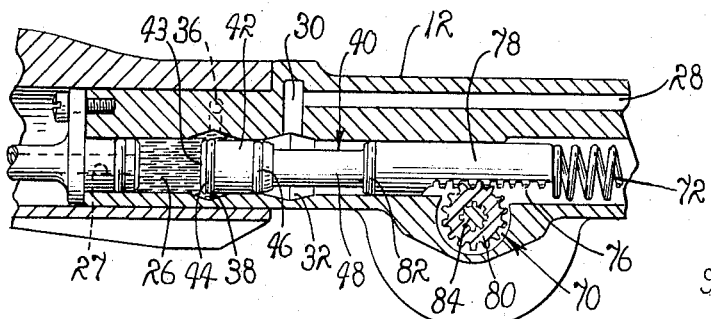
Fig. 3.
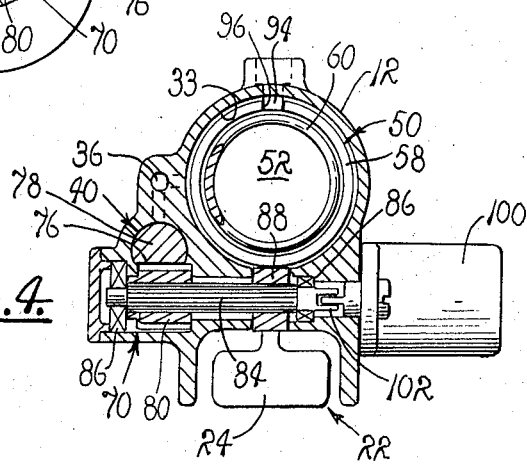
Fig. 4.
Fig. 5.
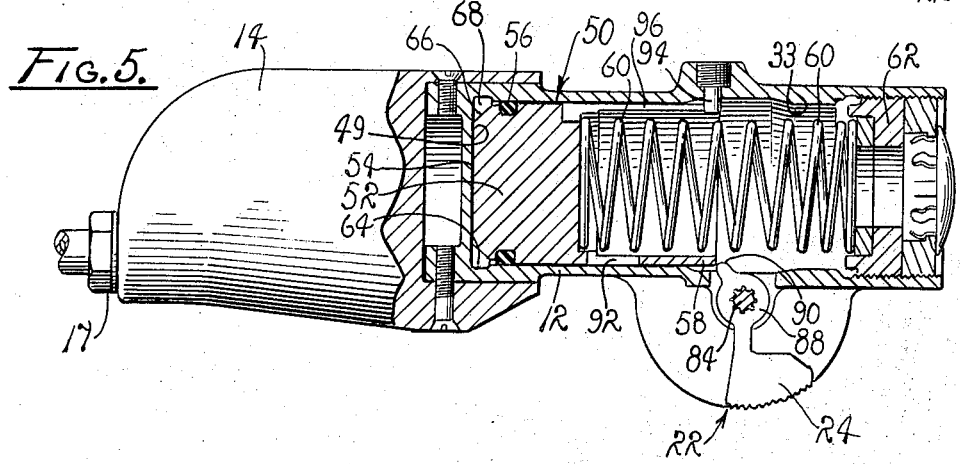
Fig. 7.
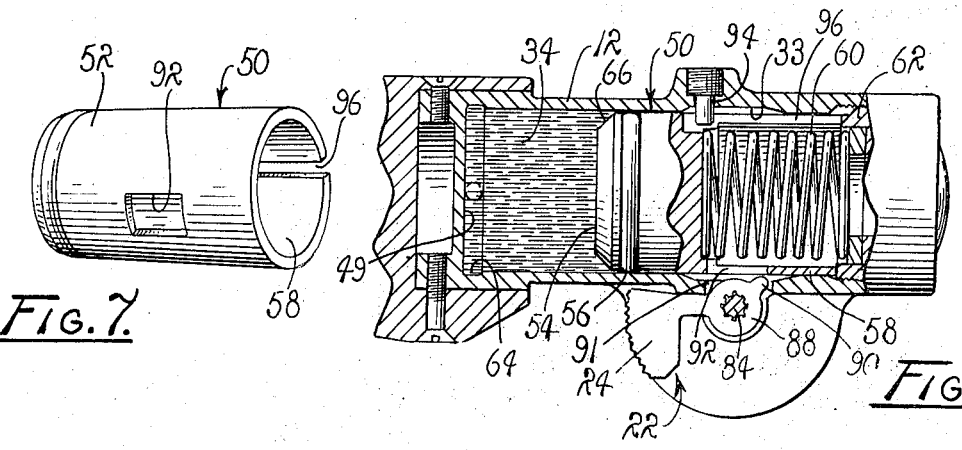
Fig. 6.

METERING GUN FOR DISPENSING PRECISELY MEASURED CHARGES OF FLUID

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to fluid dispensers and more particularly to a dispenser for delivering precisely measured quantities of potable water to crewman aboard operative spacecraft.

The prior art, of course, is replete with valves and similar devices designed and particularly suited for use in dispensing cold potable water from pressurized systems. However, such valves normally are intended to establish a flow which is maintained so long as the valve is opened.

Furthermore, it is appreciated that valves have long been employed in delivering precisely measured quantities of fluid. Such valves are represented by the disclosure of U.S. Letters Pat. No. 411,375. This patent disclosed a selector valve which, when in a first condition, charges a chamber and, when switched to an opposite condition, permits a spring to drive a piston through the charged chamber for discharging a predetermined quantity of fluid therefrom. However, known valves and devices fail to meet the requirements or satisfy needs arising because of environmental conditions encountered by crewman aboard operating spacecraft.

For example, it is highly desirable to maintain an accurate record of the total quantity of water taken in and utilized by each crewman while aboard an operating spacecraft, while affording the crewman practical unrestrained access thereto. Consequently, the amount of water dispensed during any given cycle of operation for a given dispenser must be precisely and expeditiously measured, recorded, and actually taken by the crewman. Hence, it is preferred that once the dispenser is triggered for initiating a cycle of operation, the dispenser be afforded a continuous operation, uninhibited through "double triggering" or accidental arrest. Furthermore, it is imperative that the water be confined and not accidentally be "spilled" and dispersed throughout the spacecraft's cabin. Preferably, the dispenser should be configured to be hand-held and digitally operated for accommodating its use in an environment wherein weight and bulk must be minimized while simplicity is maximized.

Accordingly, currently available dispensers fail to meet existing needs, particularly where a dispenser is utilized in dispensing water aboard spacecraft. Accordingly, the purpose of the instant invention is to provide a simple, economic, and practical dispenser capable of being selectively operated for dispensing precisely measured charges of drinking water with a predictable degree of accuracy.

SUMMARY OF THE INVENTION

It is therefore an object of the instant invention to provide an improved dispenser for fluids and the like.

It is another object to provide an improved dispenser for dispensing predetermined quantities of fluid.

It is another object to provide a dispenser for delivering accurately measured charges of potable water.

It is another object to provide a dispenser for measuring and delivering precisely measured quantities of potable water to crewmen aboard spacecraft.

It is another object to provide a simple, economic, and practical dispenser for dispensing predetermined, precisely measured charges of potable water aboard operative spacecraft.

It is another object to provide a dispenser for delivering and recording precisely measured quantities of potable water to crewmen aboard spacecraft.

These and other objects and advantages are achieved through the use of a compact, lightweight dispenser which includes a housing configured to be received within the palm of a crewman's hand, having a jet configured to be received between the crewman's lips and an actuator responsive to a digitation of a thumb-actuated lever, as will become more readily apparent by reference to the following description and claims, in light of the accompanying drawings.

BRIEF DESCRIPTION OF THE DRAWINGS

FIG. 1 is a side elevation of an assembled dispenser which embodies the principles of the instant invention.

FIG. 2 is a partially sectioned side elevation of the dispenser shown in FIG. 1, illustrating a first position for a flow-control shuttle pin.

FIG. 3 is a fragmentary view of the dispenser of FIG. 2, illustrating a second position for the flow-control shuttle pin.

FIG. 4 is a cross-sectional view taken generally along line 4—4 of FIG. 1.

FIG. 5 is a partially sectioned side elevation of the dispenser shown in FIG. 1, taken in a plane beneath the plane of the section of FIG. 2, illustrating a first position of a spring-biased plug which defines one wall of an expansible measuring chamber.

FIG. 6 is a view quite similar to FIG. 5, illustrating an alternate position of the plug.

FIG. 7 is a perspective view of the plug shown in FIGS. 5 and 6.

FIG. 8 is a partially sectioned, fragmented top plan view of the dispenser shown in FIG. 1.

DESCRIPTION OF THE PREFERRED EMBODIMENT

Referring now to the drawings wherein like reference characters designate like or corresponding parts theroughout the several views, there is shown in FIG. 1 a dispenser 10 which embodies the principles of the instant invention.

The dispenser 10 preferably is fabricated from materials compatible with its intended use. Consequently, it is to be understood that the dispenser 10, including its various components, is fabricated employing known techniques and suitable materials.

As shown, the dispenser 10 includes an elongated housing 12. The housing 12, in turn, is provided with a suitable grip 14 suitable for grasping within the palm of a crewman's hand whereby the crewman can support the dispenser in an operative disposition. The housing 12, in practice, is coupled to a source of potable water through a suitable conduit 16, preferably a flexible conduit, through which the water is delivered to the housing. As a practical matter, a fitting 17 is employed in coupling the conduit 16 to the housing 12.

An opposite end of the housing 13, with respect to the fitting 17, there is a dispensing jet 18 provided with a mouthpiece 20 configured to be received between the lips of a crewman. Thus, water is delivered to the housing 12 via the conduit 16, and delivered therefrom directly to a crewman, via the jet 18 without encountering "spill," even when employed in a weightless environmnet.

Additionally, there is mounted on the housing 12 a trigger unit, generally designated 22. The trigger unit 22 includes a thumb-actuated lever 24 which, in operation, is digitated for initiating a cycle of operation of the dispenser. Hence, it is to be understood that the dispenser 10 is particularly suited to be grased within the palm of a crewman's hand, received between the crewman's lips and the lever 24 subsequently digitated for initiating the cycle of operation, whereby water delivered through the conduit 16 is dispensed through the jet 18 directly into the mouth of the crewman.

The housing 12 is provided with a network of fluid conducting passageways including a bore 25 defining an inlet passageway 26 which terminates at an intake port 27. The fitting 17 is seated in the intake port 27 and is fixed on the housing 12 by employing any suitable means, including a plurality of mounting screws and suitable seals, not designated. Therefore, water to be dispensed enters the housing 12 through the intake port 27 and the inlet passageway 26.

The passageway 26 communicates with a dispensing passageway 28 which, in turn, terminates at the mouthpiece 20 of the jet 18. Communication of the passageways 26 and 28 is effected through a passageway 30, which extends to the passageway 28 from a valving chamber 32 of an annular configuration, concentrically formed within the passageway 26.

The passageway 26 also communicates with a bore 33, having defined therein a measuring chamber 34, through a coupling passageway 36. The passageway 36 extends to the chamber 34 from a valving chamber 38, also of an annular configuration, concentrically related to the passageway 26. The valving chamber 38 is disposed between the intake port 27 and the annular valving chamber 32 in spaced coaxial relation therewith. Within the inlet passageway 26 there is seated a shuttle pin 40 supported for rectilinear reciprocation.

The shuttle pin 40 cooperates with the intake port 27 and the valving chambers 32 and 38 in performing a valving function for controlling the flow of water from the intake port 27 to the jet 18. To accomplish a valving function, the distal end of the shuttle pin 40 is provided with a cylindrical valve head 42 having a face 43 positionable adjacent to the intake port 27. The valve head 42 has a diameter substantially equal to the diameter of the inlet passageway 26 and includes an O-ring seal 44 circumscribing its distal end, while an O-ring seal 46 circumscribes the base of the valve head. As a practical matter, the valve head 42 is supported by an elongated valve body 48 of a cylindrical configuration having a diameter substantially less than the diameter of the valve head 42. The O-ring seals 44 and 46 are seated on the valve head 42 in appropriately formed grooves and are employed for sealingly engaging the internal surfaces of the inlet passageway 26 so that passages of water therebetween is precluded.

In order to perform a desired valving function, the shuttle pin 40 is selectively extended or retracted for repositioning the valve head 42 between a first position immediately adjacent to the intake port 27 and a second position located between the releasing chambers 32 and 38. The length of the valve head 42, and the spacing between the O-rings 44 and 46 are such as to permit the valving chambers 32 and 38 to communicate through the passageway 26, when the shuttle pin 40 is extended to seat the valve head 42 in a first position adjacent to the intake port 27, for thus interrupting the flow of water into the housing 12. Thus, the measuring chamber 34 is permitted to communicate with the dispensing passageway 28 through the valving chamber, as shown in FIG. 2. However, once the shuttle pin 40 is retracted, for thereby seating the valve head 42 in its second position, communication between these chambers is interrupted through an engagement of the O-ring seal 46 with a portion of the internal surface of the passageway 26 located between the chambers 32 and 38. When the shuttle pin 40 is thus seated in its second position, the intake port 27 communicates with the measuring chamber 34, through the valving chamber 38 and passageway 36, as best illustrated in FIG. 3.

It should therefore readily be apparent that merely by axially displacing the shuttle pin 40 for repositioning the valve head 42 between the first and second positons, relative to the intake port 27 and the valving chambers 32 and 38, the measuring chamber 34 is caused to communicate with the intake port 27, for thereby receiving a charge of water, the quantity thereof being established by the dimensions of the chamber 34 or, alternatively, caused to communicate with the jet 18 for dispensing a measured charge of water.

The measuring chamber 34 is, in practice, a bore of a cylindrical configuration terminating in a base wall 49. The chamber 34 receives therein a reciprocable skirted plug, generally designated 50, which includes a plug head 52 having a transverse planar face 54 defining a displaceable wall disposed in parallelism with the base wall 49. In order to establish a seal between the adjacent internal surface of the chamber 34, the skirted plug 50 is provided with a circumscribing O-ring seal 56 seated in an appropriately provided groove, not designated. It is to be understood that the dimensions of the measuring chamber 34 at any given instant are determined by the position then assumed by the plug 50 relative to the longitudinal axis of the chamber 34.

The plug 50 is provided with a tubular skirt 58 within which is seated a helical compression spring 60. The spring 60 is supported within the skirt 58 by a closure plug 62 fixed within the distal end of the bore 33 within which is defined the measuring chamber 34. In practice, the spring 60 has a spring constant so selected that the spring is permitted to collapse under the forces applied thereto as a result of system-pressure, of the source of the water, applied to the face 54. It can therefore be appreciated that the spring 60 continuously urges the plug head 52 toward the base wall 49 for thereby minimizing the dimensions of the measuring chamber 34.

As a practical matter, an annular groove 64 circumscribes the base of the chamber 34, adjacent the wall 49, while the plug head 52 is provided with an annular, tapered surface 66 terminating in the plane of the face 54. Thus, the surface 66 and the groove 64 assume a concentric relationship when the face 54 of the plug head 52 is seated against the base wall 49 of the chamber 34 and collectively define a starter chamber 68. This chamber accommodates a delivery of fluid pressures from the intake port 27, through the passageway 36, in order that displacement in opposition to the applied forces of the spring 60 can be initiated in response to a repositioning of the valve head 42. Therefore, it should be apparent that once the shuttle pin 40 is retracted to a position such that the passageway 36 is caused to communicate with the intake port 27, system-pressure of the source of water is transmitted to the annular starter chamber 68 for initiating axial displacement of the plug 50 against the applied forces of the spring 60.

Retraction of the shuttle pin 40 is effected through an activation of a rack-and-pinion drive coupling 70 against a compression spring 72 seated in the bore 25 and interposed between the base of the shuttle pin 40 and a threaded closure plug 74 affixed to the housing 12 in coaxial alignment with the inlet passageway 26. The spring 72 also is provided with a spring constant such that the spring is capable of developing a force greater than the force developed as a consequence of system-pressure applied to the face 43 of the head 42.

As a practical matter, the rack-and-pinion drive coupling 70 includes a rack 76 suitably machined on a base portion 78 of the shuttle pin 40, and a pinion 80 meshed with the rack 76. It is to be understood that rotational displacement of the pinion 80 is converted to linear motion imparted to the shuttle pin 40 through the rack-and-pinion coupling. Since the spring 72 is a compression spring, it should be apparent that the rack-and-pinion drive coupling 70 is employed in advancing the shuttle pin 40, in retraction, against the applied force of the spring 72, while the spring 72 is employed for advancing the shuttle pin 40 in an opposite direction.

Of course, the position of the valve head 42 relative to the inlet passageway 26 is, at any given instant, determined by the balance of forces applied to the shuttle pin 40 through the rack-and-pinion drive coupling 70 and the compression spring 72. Furthermore, and as a practical matter, the base portion 78 of the shuttle pin 40 is isolated from the passageway 26 through the use of a suitable O-ring seal 82 seated in appropriate annular grooves, not designated, located in juxtaposition with the valve body 48.

The pinion 80 of the rack-and-pinion drive coupling 70 is supported by a splined shaft 84. The shaft 84, in turn, is supported by a suitable bearing structure 86 located at each of its opposite ends, FIG. 4. The shaft 84 thus is supported for imparting angular displacement to the pinion 80.

The splined shaft 84 also serves to support the thumb-actuated lever 24, FIG. 4, which includes a base 88 machined to receive the shaft 84. Hence, angular displacement of the thumb-actuated lever 24, about the axis of rotation of the splined shaft 84, serves to impart rotation to the splined shaft for thereby imparting rotational displacement to the pinion 80.

With particular reference to FIGS. 4, 5 and 6, the base 88 includes a protuberance 90 extended through an appropriately formed opening 91 into the bore 33 adjacent to the skirt 58 of the skirted plug 50. This protuberance is configured and dimensioned so as to be interposed within the path of the skirted plug 50 when the plug head is seated at the bottom of the bore 33, and the valve head 42 is seated in its port sealing disposition, relative to the intake port 27. In order to accommodate an axial displacement of the skirted plug 50, for thus accommodating an acceptance of water into the chamber 34, from the intake port 27, it is necessary first to rotate the splined shaft 84 through a distance sufficient for displacing the protuberance 90 from the path of the skirt 58. This, of course, occurs simultaneously with the axial displacement of the valve head 42, for thereby permitting the passageway 36 to communicate with the intake port 27.

It should also be apparent that once the protuberance 90 is removed from the path of the skirt 58 and the skirted plug 50 is permitted to advance in retraction, the skirt 58 is disposed immediately adjacent to the protuberance 90. The skirt now serves as a stop which precludes a counterrotation of the splined shaft 84 for thereby precluding an interruption of the flow of water from the intake port 27 to the measuring chamber 34 until such time as the dimensions of the measuring chamber 34 are maximized. Thus, the chamber becomes fully expanded for accepting a precisely measured charge of water.

In order to accommodate a release of the thumb-actuated lever 24, and thus permit the dispenser to discharge the water from the measuring chamber 34 via the jet 18, it is necessary to impart a counterrotation to the splined shaft 84. This counter-rotation is through a distance sufficient to reseat the valve head 42 in its first position adjacent to the intake port 27. Hence, communication between the coupling passageway 36 and the annular valving chamber 32 concurrently is established. Such rotation is accommodated by an opening 92 formed in the skirt 58, at a location immediately opposite the protuberance 90 when the skirted plug 50 is fully retracted. The opening 92 therefore accommodates an angular displacement of the protuberance 90 about the axis of rotation of the splined shaft 84. Alignment of the opening 92 and the protuberance 90 is maintained by an alignment pin 94 extended radially into an alignment slot 96 extended substantially the length of the skirt 58.

Upon release of the lever 24, the compression spring 72 also is rendered effective for extending the valve head 42 to its sealing position relative to the intake port 27, while concurrently permitting the measuring chamber 34 to communicate with the jet 18, through the passageways 26, 28, 30 and 36. This communication removes system-pressure from the chamber 34 and accommodates a discharge from the chamber a measured charge of water delivered from the intake port 27 via the passageways 26 and 36.

A cycle of operation of the dispenser 10, of course, is initiated simply by displacing the thumb-actuated lever 24 a distance sufficient for removing the protuberance 90 from the path of the skirt 58 and bringing the intake port 27 into communication with the passageway 36, whereupon the chamber 34 is charged with a precisely determined quantity of water received from the intake port 27. The chamber 34 is permitted to discharge the received charge only after the chamber 34 has completely been filled, and the thumb-actuated lever 24 released. Of course, the fact that a discharge of the chamber 34 can be effected only after the lever 24 is released permits a crewman to properly position his lips over the mouthpiece 20 before releasing the lever. Furthermore, the fact that an initiation of a cycle of operation followed by a release of the lever causes the dispenser to complete a full operational cycle affords the dispenser a high degree of simplicity and effectiveness in dispensing water.

It often is desired to determine the total quantity of water taken by a crewman on a given mission aboard the spacecraft. Therefore, a cycle counter 100, where desired, is coupled with the splined shaft 84 through a suitable drive coupling 102. The particular counter employed can be varied, as desired. However, a simple indexing counter which serves to record successive steps of rotation serves quite satisfactorily for this purpose. Through the counter 100 it is possible to determine the total number of angular displacements imparted to the thumb-actuated lever 24. In view of the fact that the quantity of water dispensed during each cycle of operation is an accurately determined quantity, the total quantity of water consumed by the crewmen is readily determinable.

OPERATION

It is believed that in view of the foregoing description, the operation of the device will be readily understood and it will be briefly reviewed at this point.

The dispenser 10 is particularly suited for use in a weightless environment. Due to the compactness of the dispenser, and its simplicity and configuration the dispenser readily can be held within the grasp of crewmen, aboard a spacecraft, for purposes of supplying the crewmen with water in a manner which precludes spilling or ejection into cabin space. Once the dispenser 10 is grasped by a crewmen, the mouthpiece 20 is inserted between his lips and the thumb-actuated lever 24 is displaced from an initial position through a suitable digitation. As the lever 24 is rotated, the shuttle pin 40 is retracted, against the applied forces of the compression spring 42, for thereby axially displacing the valve head 42 from its first position and along the inlet passageway 26 toward its second position.

As the shuttle pin 50 is retracted, the protuberance 90 is displaced from the path of the skirt 58, of the skirted plug 50, so that axial displacement of the plug head 50 along the measuring chamber 34 is accommodated. Continued displacement of the thumb-actuated lever 24 serves to impart continued rotation to the pinion 80 for thus continuing the axial displacement of the shuttle pin 50 toward its second position wherein the starter chamber 68 is caused to communicate with the intake port 27, through the passageway 36, while the passageway 36 becomes isolated from the dispensing passageway 28 as the valve head 42 is seated in its second position. In this position, the shuttle pin 40 affords a charging of the measuring chamber 34 through the passageway 36.

Of course, axial displacement of the skirted plug 50 is initiated in response to an introduction of water, under system-pressure, to the starter chamber 68. Initial displacement of the skirted plug 50 advances the skirt 58 to a position opposite the protuberance 90 so that a return of the thumb-actuated lever 24 toward its initial position is prohibited until such time as the chamber 34 is completely charged and the opening 92 positioned immediately adjacent to the protuberance 90.

A release of the thumb-actuated lever 24 permits the compression spring 72 to displace the shuttle pin 40 in an opposite direction, toward the intake port 27, for again sealing the intake port 27, relative to the passageway 36, and simultaneously therewith cause the passageway 36 to communicate with the jet 18, via the passageways 26, 28 and 30.

It is to be understood that the thumb-actuated lever 24 is rotated sufficiently for repositioning the protuberance 90 at a location which permits the skirt 58 to pass beneath the protuberance 90 as the spring 60 advances the plug head 52 toward the base wall 49 of the chamber 34 for discharging a charge of water.

In view of the fact that the crewman has accepted the mouthpiece 20 between his lips, the water is discharged into his mouth without encountering spill, waste and the like. Furthermore, in instances where the counter 100 is employed, each initial displacement of the splined shaft 84 serves to index the counter 100 through one step so that a record of the total quantity of water consumed by the crewman during a given mission aboard a spacecraft can accurately be maintained.

In view of the foregoing, it should readily be apparent that the dispenser of the instant invention provides a practical solution to the problem of providing ready access to potable water in a weightless environment encountered aboard spacecraft, while maintaining an accurate record of the total quantity of water consumed.

Although the invention has been herein shown and described in what is conceived to be the most practical and preferred embodiment, it is recognized that departures may be made therefrom within the scope of the invention, which is not to be limited to the illustrative details disclosed.

We claim:

1. A dispenser for measuring and delivering precisely measured charges of fluid comprising:
   a. a sealed housing;
   b. a fluid inlet conduit entering one end of said housing and a fluid outlet terminating adjacent the opposite end thereof;
   c. an inlet passageway within said housing extending over a portion of the length of said housing and having selective communication with said fluid inlet conduit;
   d. a dispensing passageway within said housing extending over a portion of the length of said housing and communicating with said inlet passageway;
   e. a measuring chamber within said housing extending over a portion of the length of said housing and communicating with said inlet passageway;
   f. an elongated shuttle pin having a valve head at one end thereof supported for axial reciprocation within said inlet passageway;
   g. means for biasing said shuttle pin toward a first position wherein said fluid inlet conduit is closed and flow is permitted between said measuring chamber and said dispensing passageway;
   h. means for shifting said shuttle pin to a second position wherein flow is permitted between said fluid inlet conduit and said measuring chamber and prevented between said measuring chamber and said dispensing passageway;
   i. means within said measuring chamber for exerting pressure on fluid within said chamber.
   j. said means for shifting said shuttle pin comprising rack-and-pinion drive means;
   k. a lever coupled with said drive means adapted to be rotated digitally for imparting rotation to said pinion for shifting said shuttle pin to said second position;

1. means for preventing the movement of said shuttle pin from said second position to said first position until a predetermined quantity of fluid has entered said measuring chamber.

2. The invention as defined in claim 1 wherein said means for shifting said shuttle pin further comprises a splined shaft supporting said pinion of said rack-and-pinion drive means and a cycle counter coupled with said shaft.

3. The invention as defined in claim 1 including a reciprocable plug having a head and an elongated skirt extending from said head, said means for preventing the movement of said shuttle pin comprising a protuberance rigidly attached to and rotatable with said lever, said skirt blocking rotation of said protuberance during the period said predetermined quantity of fluid is entering said measuring chamber.

4. The invention as defined in claim 3 including an opening in said skirt, said opening being immediately adjacent said protuberance when said predetermined quantity of fluid has entered said measuring chamber.

* * * * *